United States Patent
Benco et al.

(10) Patent No.: US 7,110,518 B2
(45) Date of Patent: Sep. 19, 2006

(54) NETWORK SUPPORT FOR ENHANCED DIALING CAPABILITY

(75) Inventors: David S. Benco, Winfield, IL (US); Kevin J. Overend, Elmhurst, IL (US); Baoling S. Sheen, Naperville, IL (US); Sandra Lynn True, St. Charles, IL (US); Kenneth J. Voight, Sugar Grove, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 93 days.

(21) Appl. No.: 10/854,847

(22) Filed: May 27, 2004

(65) Prior Publication Data

US 2005/0265538 A1 Dec. 1, 2005

(51) Int. Cl.
*H04M 3/42* (2006.01)
*H04M 3/00* (2006.01)
*H04M 1/00* (2006.01)

(52) U.S. Cl. ............... 379/207.02; 379/286; 379/359

(58) Field of Classification Search ............... 379/40, 379/100.14, 286, 359, 456, 207.02
See application file for complete search history.

(56) References Cited

U.S. PATENT DOCUMENTS 6,104,807 A * 8/2000 Johnson et al. ........ 379/428.04
6,370,149 B1 * 4/2002 Gorman et al. ............. 370/419

OTHER PUBLICATIONS

Nortel Knowledge Networks, Meridian Digital Telephones, Model M3903, Issue 1.00, Jan. 2002.*

* cited by examiner

*Primary Examiner*—Bing Q. Bui

(57) ABSTRACT

A method is provided for supporting an enhanced dialing service in telecommunications equipment. The method includes: receiving a series of dialed digits from customer premises equipment (CPE) (10); determining if the dialed digits correspond to a designated identity; as each dialed digit in the series is received, advancing a call processing state of the telecommunications equipment in accordance with the dialed digit when the dialed digit does not correspond to the designated identity; and, returning the call processing state of the telecommunications equipment to a prior call processing state when the dialed digit does correspond to the designated identity.

18 Claims, 2 Drawing Sheets

NETWORK SUPPORT FOR ENHANCED DIALING CAPABILITY

FIELD

The present inventive subject matter relates to the telecommunication arts. Particular application is found in conjunction with telecommunication switches (e.g., a class 5 switch such as the 5ESS and/or other like telecommunication switches), and the specification makes particular reference thereto. However, it is to be appreciated that aspects of the present inventive subject matter are also amenable to other like applications, e.g., without limitation, a voice menu front-end interface.

BACKGROUND

In the context of a wireless telecommunication network, wireless subscribers are accustomed to having the capability of editing their outgoing dialed telephone numbers, e.g., when they are incorrectly keyed-in or as otherwise desired. This feature is embedded within the mobile handset or wireless telephone insomuch as the subscriber must push the "send" key or another designated button after the desired telephone number is entered. As processing of the dialed telephone number is not started until after the "send" key is pushed, a wireless subscriber typically has the convenience of editing the dialed telephone number at any time prior to pushing the "send" key.

In the context of a wireline or landline telecommunications network, the aforementioned convenience has heretofore not been supported by the network and/or provided to landline subscribers.

Unlike in the foregoing wireless example, when a telephone number is dialed from a landline device (e.g., a telephone or other customer premise equipment (CPE) or some end user device) served by a telecommunications switch (e.g., a class 5 switch such as the 5ESS or the like), typically processing of the dialed telephone number by the switch proceeds as each digit is dialed or entered. That is to say, typically the call processing state of the switch is updated after each digit or some number of digits in the telephone number are entered and received. The start of processing the dialed telephone is usually not delayed until all the dialed digits have been received by the switch. For example, assuming the first digit dialed and received by the switch is a "1", then the call processing state of the switch is updated to reflect a long distance call even if the remainder of the digits have not yet been dial and/or received by the switch. The switch recognizes that the telephone number being dialed will take the switch to or through a particular call processing state regardless of what the remaining digits are, and therefore, it updates its call processing state accordingly even if the remaining digits of the telephone number have not yet been received. In this way, the time it takes to process a dialed telephone number can be minimized or reduced in comparison to waiting for all the dialed digits to be received before starting to process the dialed telephone number.

However, processing of dialed telephone numbers in the manner of the foregoing landline example, does not support editing of the dialed telephone numbers in the same way as the foregoing wireless example. Accordingly, it would be advantageous for landline subscribers to have the same benefits and convenience wireless subscribers enjoy to edit outgoing dialed telephone numbers. This advantageous would be particularly appreciated when nearing the end of dialing a long telephone number (e.g., a 14-digit international number), and a wrong or incorrect digit is erroneously or accidentally entered. In such an instance, it would be beneficial to merely edit the incorrectly entered digit rather than hanging-up and placing the call again, i.e., having to redial the telephone number over from the beginning.

Another situation arises when navigating through a voice menu front-end interface employed by many businesses. Often there is no way to recover from a menu option selection error. In those cases where recovery is possible, a user often has to wait and listen to numerous options to identify the number associated with a back-up, return to previous or main menu, or a "repeat choices" option. This inconvenience arises because many of these system have adopted their own peculiar way of handling this type of user interaction scenario. That is to say, there is generally no universal model for editing misdialed digits.

Accordingly, a new and improved enhanced dialing service and/or feature is disclosed that overcomes the above-referenced problems and others.

SUMMARY

In accordance with one preferred embodiment, a method is provided for supporting an enhanced dialing service in telecommunications equipment. The method includes: receiving a series of dialed digits from customer premises equipment (CPE); determining if the dialed digits correspond to a designated identity; as each dialed digit in the series is received, advancing a call processing state of the telecommunications equipment in accordance with the dialed digit when the dialed digit does not correspond to the designated identity; and, returning the call processing state of the telecommunications equipment to a prior call processing state when the dialed digit does correspond to the designated identity.

In accordance with another preferred embodiment, a telecommunications apparatus is provided that supports an enhanced dialing service. The telecommunications apparatus includes: means for receiving a series of dialed digits from customer premises equipment (CPE); means for determining if the dialed digits correspond to a designated identity; as each dialed digit in the series is received by the means for receiving, means for advancing a call processing state of the telecommunications apparatus in accordance with the dialed digit when the dialed digit does not correspond to the designated identity; and, means for returning the call processing state of the telecommunications apparatus to a prior call processing state when the dialed digit does correspond to the designated identity.

In accordance with yet another preferred embodiment, a central office (CO) is operatively connected to a public switch telephone network (PSTN) and serves customer premises equipment (CPE). The CO includes a telecommunication switch that: receives a series of dialed digits from the CPE; determines if the dialed digits correspond to a designated identity; as each dialed digit in the series is received, advances its call processing state in accordance with the dialed digit when the dialed digit does not correspond to the designated identity; and, returns its call processing state to a prior state when the dialed digit does correspond to the designated identity.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
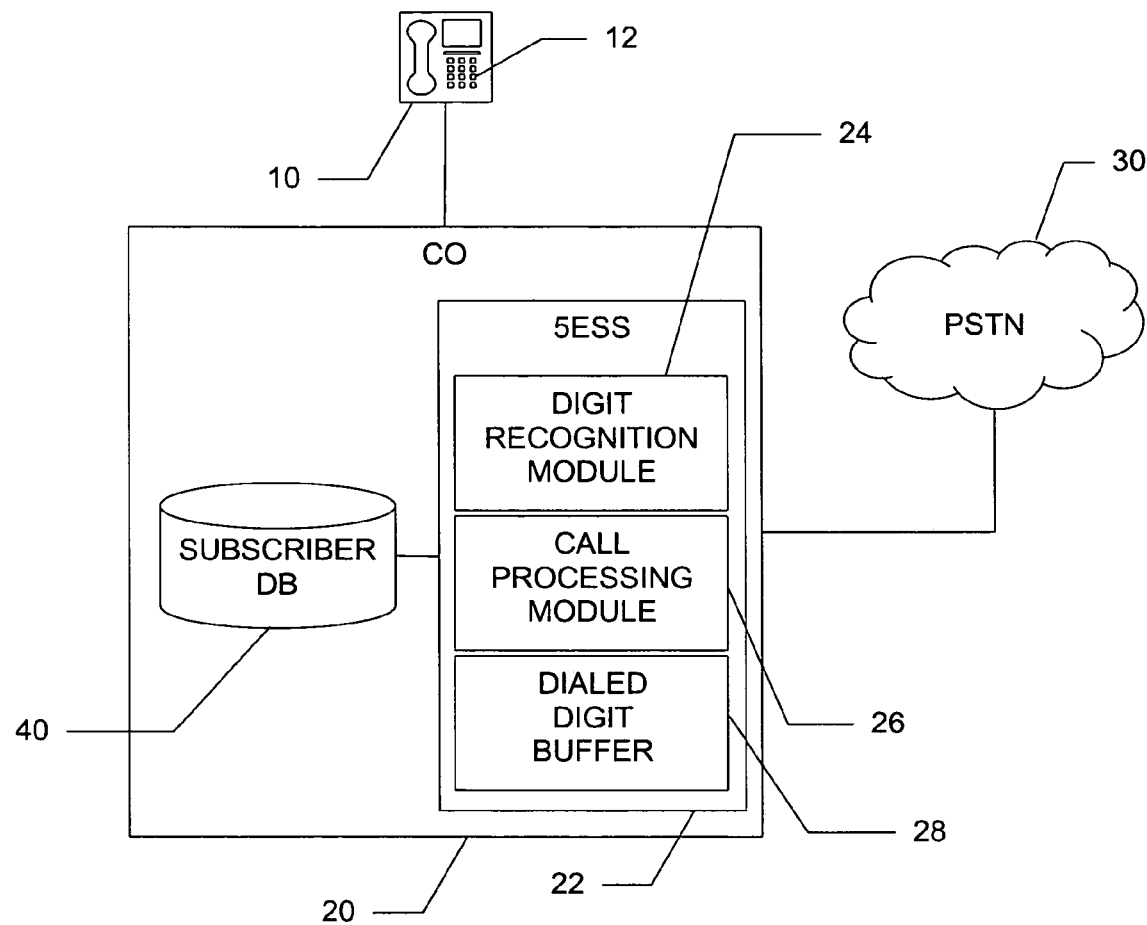
FIG. 1 is a block diagram illustrating an exemplary telecommunications network suitable for practicing aspects of the present inventive subject matter.

With reference to FIG. 1, a wireline or landline subscriber uses customer premises equipment (CPE) 10 to selectively place a telephone call over a telecommunications network. The CPE 10 is optionally a landline telephone or other like end user telecommunication device. Suitably, the CPE 10 is equipped similar to any traditional landline CPE, including, along with other traditional equipment and features, a standard 12 button keypad 12 used for dialing outgoing telephone numbers and other input (e.g., menu selection when navigating through a voice menu front-end interface). In the usual manner, the keypad 12 includes buttons and/or keys for the digits 1–9, a star "*" button/key and a pound "#" button/key.

Suitably, the CPE is served by a central office (CO) 20 that is operatively connected to a public switched telephone network (PSTN) 30 in the usual manner. The CO 20 includes a telecommunications switch 22 (e.g., a class 5 switch such as the 5ESS or another like switch) to which the CPE 10 is operatively connected in the usual manner via a wireline or landline. While for simplicity and clarity herein only one CPE 10 and CO 20 are illustrated in the present example, it is to be appreciated that a single CO suitably serves a plurality of similarly situated CPEs and that a plurality of such COs are similarly equipped and likewise arranged with respect to the PSTN 30.

As shown, the CO 20 includes a subscriber database (DB) 40 that is selectively accessed by the switch 22 to check on the status of a subscriber's subscription. For example, the DB 40 suitably contains information identifying which subscribers served by the CO 20 subscribe to an enhanced dialing service and/or feature. The enhanced dialing service/feature permits a subscriber dialing an outgoing telephone number with the CPE 10 to edit or change misdialed digits without delaying the start of call processing.

Suitably, by pressing the "#" key or another designated key on the CPE's keypad 12, a subscriber may selectively back-up through one or more preceding dialed digits and change or edit them. That is to say, for each time the designated editing key is dialed or pressed, the subscriber backs-up one digit in the dialed telephone number. When the subscriber has backed-up as far as desired, they may then continue dialing from that point forward, e.g., entering the correct digits in place of previously misdialed digits.

Suitably, the switch 22 includes a digit recognition module (DRM) 24, a call processing module (CPM) 26, and a dialed digit buffer (DDB) 28. The DRM 24 is responsible for recognizing which digit is dialed by the CPE 10 when it is received by the switch 22. The CPM 26 updates the call processing state of the switch 22 in response to received digits that have been dialed by the CPE 10. Suitably, the call processing state of the switch 22 is updated by the CPM 26 as the digits are received by the switch 22, i.e., without waiting for the entire dialed telephone number to be received by the switch 22. Suitably, the DDB 28 temporarily stores dialed digits as they are received by the switch 22 from the CPE 10.

Figure 2:
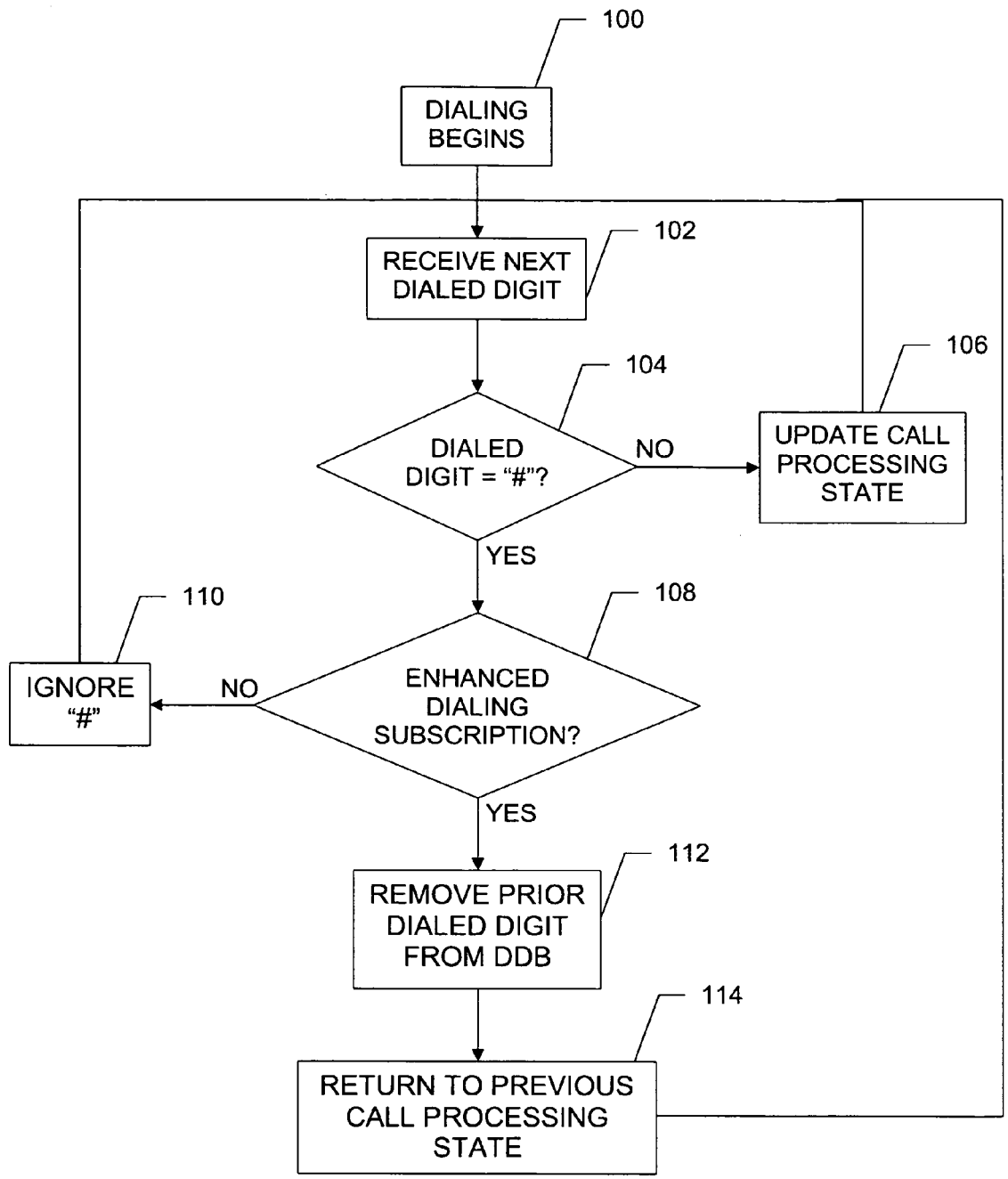
FIG. 2 is a flow chart showing an exemplary call processing process embodying aspects of the present inventive subject matter.

With reference to FIG. 2, a flow chart provides an example of how the CPM 26 operates. At step 100, a subscriber begins dialing a desired telephone number with the CPE 10. As each digit is dial, it is received (at step 102) and acted upon by the switch 22.

Suitably, the DRM 24 recognizes the identity of the digit received. At decision step 104, it is determined if the received digit corresponds to the "#" key. If "#" was not dialed and received by the switch 22, then the process branches to step 106 where the call processing state of the switch 22 is updated by the CPM 26 in accordance with the digit dialed and received. The process then continues back to step 102 where the next dialed digit is received by the switch 22. In other words, the call processing state of the switch 22 advances in the usual manner. Otherwise, if "#" was dialed and received by the switch 22, then the process continues on to decision step 108 for possible implementation of the enhanced dialing feature, i.e., if the calling party subscribes to the service.

At decision step 108, it is determined if the calling party subscribes to the enhanced dialing service/feature, e.g., by the switch 22 querying or otherwise checking the DB 40. If the calling party does not have a subscription to the service, then at step 110 the "#" entry is ignored and the process loops back to step 102 where the switch 22 receives the next dialed digit. Otherwise, if the calling party is in fact a subscriber to the enhanced dialing service/feature, then the process continues to step 112.

At step 112, the previously dialed digit (i.e., the one just before the "#" was dialed) is removed from the DDB 28, and the switch 22 is returned to its previous call processing state by the CPM 26 at step 114. In effect, from the perspective of the switch 22, it is as if the last dialed digit had not been received. In this manner, the last dialed digit is effectively erased. The process then loops back to step 102 where the switch 22 receives the next dialed digit. Of course, if its another "#", then the next prior digit is also erased and the call processing state is again backed-up to the next prior state, otherwise the next dialed digit replaces the one just erased and the call processing state is advanced accordingly.

Optionally, the enhanced dialing service/feature is implemented within a voice menu front-end interface. In such an implementation, the "#" or other designated key would work in a similar manner. For example, by dialing the "#" more or more times, menu selections would be successively backed-up and the interface returned to prior states accordingly.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of supporting an enhanced dialing service in telecommunications equipment, said method comprising:
    (a) receiving a series of dialed digits from customer premises equipment (CPE);
    (b) determining if the dialed digits correspond to a designated identity;
    (c) as each dialed digit in the series is received, advancing a call processing state of the telecommunications equipment in accordance with the dialed digit when the dialed digit does not correspond to the designated identity; and,
    (d) returning the call processing state of the telecommunications equipment to a prior call processing state when the dialed digit does correspond to the designated identity.

2. The method of claim 1, further comprising:
    before step (d), determining if the CPE subscribes to the enhanced dialing service.

3. The method of claim 2, wherein step (d) is omitted when the CPE does not subscribe to the enhanced dialing service.

4. The method of claim 1, wherein the telecommunication equipment is a telecommunications switch.

5. The method of claim 4, wherein the switch is a class 5 switch.

6. The method of claim 1, wherein the telecommunications equipment is a voice menu front-end interface.

7. The method of claim 1, wherein the designated identity is a non-numeric digit.

8. The method of claim 1, further comprising:
    storing the received series of dialed digits in a buffer.

9. The method of claim 8, further comprising:
    deleting a last dialed digit from the buffer when a next received dialed digit corresponds to the designated identity.

10. A telecommunications apparatus that supports an enhanced dialing service, said telecommunications apparatus comprising:
    means for receiving a series of dialed digits from customer premises equipment (CPE);
    means for determining if the dialed digits correspond to a designated identity;
    as each dialed digit in the series is received by the means for receiving, means for advancing a call processing state of the telecommunications apparatus in accordance with the dialed digit when the dialed digit does not correspond to the designated identity; and,
    means for returning the call processing state of the telecommunications apparatus to a prior call processing state when the dialed digit does correspond to the designated identity.

11. The telecommunications apparatus of claim 10, wherein the telecommunication apparatus is a telecommunications switch.

12. The telecommunications apparatus of claim 11, wherein the switch is a class 5 switch.

13. The telecommunications apparatus of claim 1, wherein the telecommunications apparatus is a voice menu front-end interface.

14. The telecommunications apparatus of claim 10, further comprising:
    means for determining if the CPE subscribes to the enhanced dialing service.

15. The telecommunications apparatus of claim 14, wherein means for returning does not operate unless the CPE subscribes to the enhanced dialing service.

16. A central office (CO) operatively connected to a public switch telephone network (PSTN) and serving customer premises equipment (CPE), said CO comprising:
    a telecommunication switch that:
        receives a series of dialed digits from the CPE;
        determines if the dialed digits correspond to a designated identity;
        as each dialed digit in the series is received, advances its call processing state in accordance with the dialed digit when the dialed digit does not correspond to the designated identity; and,
        returns its call processing state to a prior state when the dialed digit does correspond to the designated identity.

17. The CO of claim 16, further comprising:
    a subscriber database that contains information which indicates whether or not the CPE subscribes to an enhanced dialing feature, said telecommunication switch accessing the subscriber database to determine if the CPE subscribes to the enhanced dialing feature.

18. The CO of claim 17, wherein the telecommunications switch does not return to a prior call processing state when the CPE does not subscribe to the enhanced dialing feature.

* * * * *